United States Patent Office 2,943,100
Patented June 28, 1960

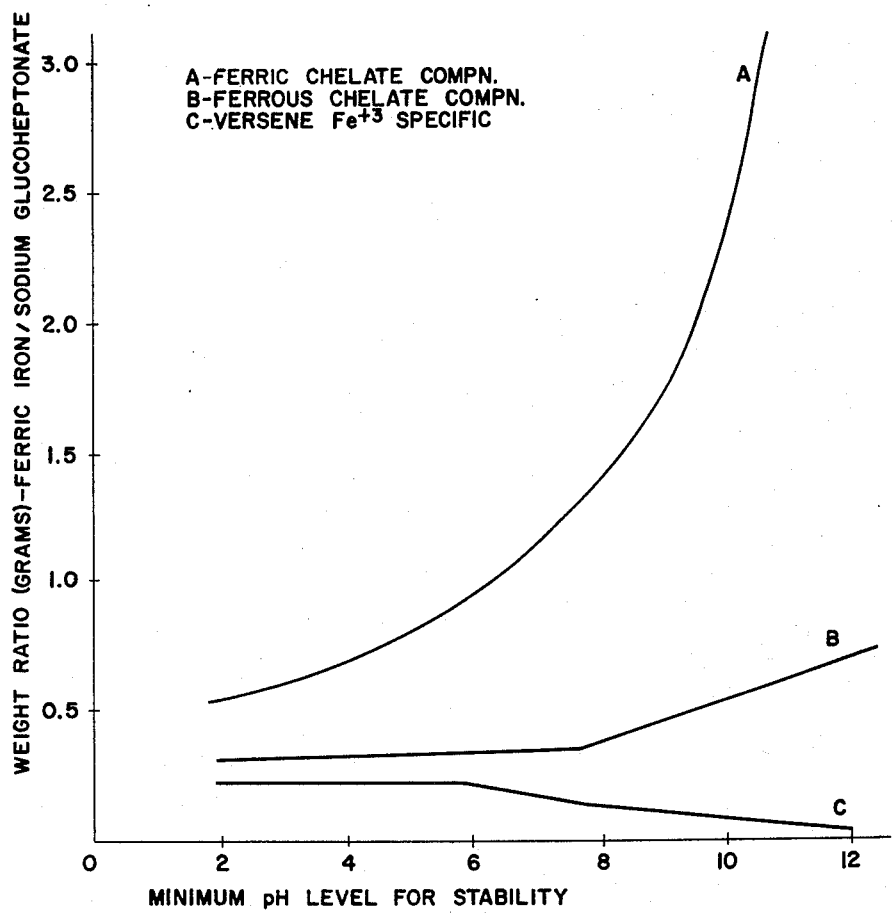

---

2,943,100

CHELATION COMPOSITION AND METHOD OF MAKING THE SAME

Arthur G. Holstein, Lake Bluff, Ill., assignor to Pfanstiehl Laboratories, Inc., Waukegan, Ill., a corporation of Illinois Filed Jan. 23, 1956, Ser. No. 560,633

18 Claims. (Cl. 260—429)

---

This invention relates to methods of preparing metal chelates and more particularly to stable chelate compositions of heavy metals and certain sugar acids and to a process of preparing such chelate compositions.

Various efforts have been made to provide heavy metal chelates for industrial, medical and agricultural uses. Some of the chelating agents employed for this purpose are ethylenediamine tetraacetic acid (EDTA), diethylenetriamine pentaacetic acid (DTPA) and hydroxyethyl ethylenediamine diacetic acid (HEEDTA or EDTA-OH). These chelating agents as well as numerous others have been found to possess a limited capacity for the chelation of heavy metals such as iron, copper, and zinc. Moreover, the chelates thus formed have been found to be stable only in limited pH ranges and are useless at pH levels beyond such ranges. Various sugar acids have been employed as chelating agents for heavy metals. However, in each instance the metal chelate formed has been found to be usefuly only at very high pH levels of the order of pH 12 to 14.

Heavy metal chelates are beginning to find substantial use in agriculture for the purpose of supplying heavy metals as micronutrients in the soil or in the form of sprays on the foliage of plants. The major need for heavy metal micronutrients is that for iron to alleviate the condition known as iron chlorosis. The majority of heavy metal chelates known to the art are relatively low in iron content, while the chelating agents employed commercially are relatively high in cost. As a consequence, it has been found necessary to use quite large quantities of such chelates per acre of soil or of foliage and the cost of treatment becomes prohibitive. Moreover, with many of the known chelating agents, the heavy metal chelates have been found to be phytotoxic. The metal chelates of sugar acids have not been found useful heretofore because of the very high pH levels required for maintenance of a stable chelate.

One of the objects of the present invention is to provide heavy metal chelate compositions of alkali-metal salts of certain sugar acids in which the compositions thus formed are stable at any pH desired.

Another object is to provide heavy metal chelate compositions of alkali-metal salts of 6 and 7 carbon sugar acids in which the compositions are stable at pH levels found useful in agricultural and industrial applications.

A further object is to provide a novel method of preparing heavy metal chelate compositions that are stable at desired pH levels.

Further objects will become apparent from the following description and examples.

According to the present invention, generally stated, heavy metal chelate compositions possessing desirable characteristics for industrial and agricultural uses are provided by reacting alkali metal salts of six and seven carbon sugar acids with heavy metal salts in aqueous media in the presence of alkali metal hydroxides until the heavy metal is completely chelated and thereafter adjusting the pH of the reaction mixture to the pH at which the chelate is to be employed for agricultural, medical or industrial purposes.

The quantity of heavy metal that can be chelated and thereafter retained in solution as a stable chelate at a desired pH has been found to vary with the ultimate pH desired in the chelate composition. In preparing heavy metal chelates of alkali-metal salts of six and seven carbon sugar acids, the quantity of heavy metal that can be retained as a stable chelate at a given pH level has been found to be proportionate to the quantity of chelating agent employed. At lower pH levels, the ratio of heavy metal to chelating agent for the maintenance of a stable chelate has been found to be lower than at high pH levels. The quantity of heavy metal that can be chelated with the alkali metal salt of the sugar acid varies with respective heavy metals and also with the oxidation state of the metal. For example, it has been found that much higher ratios of ferric iron to sugar acid salt can be obtained than is the case with ferrous iron. Likewise, higher ratios of ferric iron to sugar acid salt can be rendered stable than is the case with cupric copper.

In preparing heavy metal chelates with alkali-metal salts of six and seven carbon sugar acids by the process of this invention, it is desirable to prepare an aqueous solution of a water-soluble salt of the heavy metal, for example, the chloride, sulfate or nitrate, at a concentration at which the salt is completely soluble and to add thereto the alkali-metal salt of the sugar acid in the proportion which will provide a suitable starting ratio of metal to chelating agent, for example, a ratio of 1:1 (by weight). An alkalinizing agent such as caustic soda is then added while the reaction mixture is agitated. In place of caustic soda, ammonium hydroxide may be employed. The addition of caustic soda is continued until the chelation is completed, as evidenced by the absence of the precipitate which was formed initially in the reaction mixture. The pH of the reaction mixture is adjusted by the addition of an acid, for example, hydrochloric, sulfuric, acetic or nitric acid, until the pH level desired for the metal chelate product is attained. If a precipitate results before the desired pH is reached, an additional quantity of alkali-metal salt of the sugar acid is added and the solution is again rendered alkaline, for example, to a pH level of 11 or 12, by the addition of caustic soda solution (3% by weight) until complete chelation is again obtained. Then the pH is lowered again by the addition of acid. If the solution again shows a precipitate before the desired pH is reached, the process of addition of sugar acid salt and caustic soda with subsequent pH adjustment with acid is repeated until a metal chelate composition soluble at the desired pH is obtained. The resulting heavy metal chelate composition is composed of the heavy metal chelate of the sodium salt of the sugar acids employed plus the salts formed during the neutralization procedures. The composition possesses the unique characteristic of retaining in solution at or above the critical pH selected, for example, pH 4, not only the heavy metal chelate but also a portion of the heavy metal in ionized form. In the case of ferric iron, for example, at pH levels below 6.2 the addition of potassium ferrocyanide results in the formation of a blue color, denoting the presence of ferric ions. On the other hand, the addition of alkali such as caustic soda or ammonia to the solution of chelate composition will not precipitate the ionized portion of heavy metal even at pH levels of 12–14.

The resulting reaction mixture may be employed as such for industrial or agricultural use either at the concentration as prepared or at a lower concentration by dilution with water having a pH of 7. If the water employed is substantially alkaline, a pH adjustment to the desired pH level by the addition of acid may be necessary or desirable. As an alternative, the reaction mixture may be concentrated to any desired extent by evaporation, employing heat or heat and vacuum if desired. As a further alternative, the reaction mixture may be taken to dryness, for example, by evaporation, or by spray drying, or by concentration to a suitable specific gravity and thereafter drum dried. The resulting dry composition containing essentially the metal chelate, solubilized metal ions and the sodium salts formed during the reaction and the pH adjustment may be redissolved in water to form a spray for agricultural purposes or for industrial purposes.

It has further been found that the metal chelate composition may be recovered from the reaction mixture in solid form together with a portion of the sodium salts resulting from the pH adjustments with alkali and acid by concentrating the reaction mixture, for example, to a specific gravity of 1.4, and adding sufficient methanol to precipitate the metal chelate composition including the sodium salts. The metal chelate composition may then be filtered off and dried. When reconstituted with water, a stable metal chelate composition solution having the pH of the final reaction mixture is obtained.

By conducting a series of metal chelating reactions according to the method described hereinbefore, employing different ratios of metal to sugar acid salt and adjusting the pH to different levels, the relationship of the ratio to the pH level of stable metal chelate composition can be established. The data thus obtained can be plotted and the resulting curve can be employed to determine the proportion of metal to sugar acid salt to be used in preparing the metal chelate composition for any desired pH level in the resulting stable metal chelate composition. By employing this ratio, the metal chelate composition can be produced in a single operation, for example, by placing the indicated quantity of heavy metal salt in a suitable quantity of water, adding the indicated quantity of sugar acid salt, either as a solid or in aqueous solution, adding caustic soda solution until the heavy precipitate formed initially dissolves and the reaction mixture becomes clear and chelation is completed, and adjusting the pH to the level indicated by the curve for the ratio selected by the addition of a suitable acid.

According to the present invention, the admixture in aqueous solution of heavy metal salts such as ferric chloride or ferric sulfate, with sodium salts of sugar acids such as glucoheptonic acid does not result in the formation of a soluble iron complex until sufficient caustic soda or ammonia is added to raise the pH to the range of 9–12 or higher. Moreover, in order to obtain an iron complex under these conditions that is soluble over the pH range of 4 to 14, the weight (grams) ratio of ferric iron to sodium glucoheptonate must be approximately 1:2. In like manner, it has been found that the pH of the heavy metal and sugar acid mixture must be raised to a level of at least 9 before a stable soluble heavy metal complex is formed in the case of metals other than iron. When ferric sulfate is employed as the heavy metal source and is placed in contact with sodium glucoheptonate in 1:2 ratio in aqueous solution, the initial pH of the mixture is approximately 0.9. As caustic soda is added gradually, ferric hydroxide starts to precipitate at a pH of approximately 2.5. The precipitate becomes heavier at pH 3.5–4. When a pH of 9.5–10 is reached, the precipitate becomes completely dissolved and the solution is clear. Thereafter, the resulting solubilized iron composition may be adjusted to any pH in the range of 4–14 without any precipitation of iron occurring. It is this composition which has been found to possess desirable properties for agricultural, medicinal and industrial uses.

The sugar acids employed in the process of the present invention are those which are derived from pentoses and hexoses by the cyanidization of the sugars to form the corresponding nitriles and thereafter hydrolyzing the nitriles in the presence of alkali to form a mixture of six or seven carbon sugar acids. For example, invert sugars obtained as a form of molasses derived from cane sugar are composed largely of hexoses and include mixtures of dextrose and levulose. The cyanidization of invert sugar by treatment of the sugar with sodium cyanide in aqueous solution results in the formation of nitriles in a strongly alkaline solution. Hydrolysis to the sugar acids is then effected by boiling the reaction mixture until evolution of ammonia therefrom ceases. The resulting solution of sugar acids contains alpha and beta glucoheptonates in the form of the sodium salts thereof, and also the sodium salts of the keto-acids derived from the levulose content of the invert sugar.

Other sources of sugars may be used in place of invert sugar. For example, commercial grades of glucose react in the same way to yield solutions of sodium glucoheptonate. Another and very economical raw material for the preparation of acids has been found to be the water-soluble carbohydrate mixture obtained from thermally hydrolyzed lignocellulose. This carbohydrate mixture is sometimes referred to as "hemicelluloses." These hemicelluloses may be cyanided in the manner indicated heretofore and the resulting mixture hydrolyzed to form a mixture of six and seven carbon sugar acids.

For agricultural purposes, the metal chelates most useful are those of iron, zinc and manganese. Other metal chelates found useful in smaller concentrations are those of cobalt, boron and nickel. For a metal chelate to be useful for agricultural purposes, the chelated metal must not be easily replaced by other metals. The metal chelate must be stable against hydrolysis in all kinds of soil. The metal chelate must not be decomposed by soil microorganisms. The metal chelate must be water soluble and not easily fixed in the soil colloidal fraction and the metal content of the chelate must be available to the plant either at the root surface or somewhere within the plant. Finally, the metal chelate must be nontoxic to the treated plant and must be inexpensive. The metal chelate compositions of the present invention have been found to possess the characteristics desired for agricultural use. As an illustration, favorable results have been obtained in correcting lime-induced chlorosis with ferric and ferrous chelates of sodium glucoheptonate prepared according to the method of the present invention. The iron chelates thus prepared were employed at a rate of one to two grams of the metal chelate composition per gallon of soil in which various plants including beans and oats were grown. The chlorosis observed in plants grown in control soils was found to be corrected by such treatment and the plants were found to thrive.

The following examples will serve to illustrate various embodiments of the invention.

*Example I*

An aqueous solution of ferric chloride containing 0.2% by weight of iron was prepared. To this solution was added 0.3% by weight of sodium glucoheptonate. Upon gradual addition of 10% aqueous caustic soda solution, a heavy gelatinous precipitate of ferric hydroxide was formed at a pH of approximately 2.5. Sufficient 3% aqueous caustic soda solution was added to raise the pH to 11. The precipitate became dissolved and the solution was clear. To the clear solution was added gradually 1% aqueous hydrochloric acid until the pH of the solution was lowered to 2. The resulting solution was a composition comprising chelated ferric iron together with ionized ferric iron and sodium chloride. The iron content of the solution was found to remain in solution over the pH range of 2–14. Addition of methanol to the solution in 1:1 proportion resulted in precipitation of the chelate composition which when recovered, dried and reconstituted with water was found to possess the same characteristics as the original solution of chelate composition.

Example II

An aqueous solution of 1300 pounds of dextrose hydrate containing 91% dextrose was prepared by dissolving the dextrose in 400 gallons of water. To the resulting solution was added 300 pounds of sodium cyanide and the mixture was agitated continuously. An exothermic reaction took place. The resulting reaction mixture was allowed to cool and stand for 24 hours. The mixture was then heated to boiling and boiled until the evolution of ammonia ceased and the pH of the resulting mixture was lowered to 8. During the boiling operation it was necessary to add water to maintain the volume of the mixture. The resulting solution was found upon analysis to consist of sodium glucoheptonate with minor amounts of impurities. The solids content of the solution calculated as sodium gluconate was approximately 42%.

Example III

To a 3% aqueous solution of caustic soda was added a quantity of the sodium glucoheptonate solution prepared according to the method of Example II in amount sufficient to provide 0.3% solids by weight. Ferric chloride in amount sufficient to provide 0.2% iron by weight was added to the solution with agitation. The iron chelate thus formed was completely soluble. The pH of the solution was lowered to 7 by the addition of dilute hydrochloric acid. Methanol was added until precipitation of the iron chelate started and the solution was allowed to stand until precipitation was complete and the further addition of methanol resulted in no further precipitation. The iron chelate composition was filtered off and dried. The iron content of the composition was found to be 12%. Upon reconstitution of a portion of the iron chelate with water, a clear solution was obtained. The solution was neutral. The iron remained in solution when adjusted to a pH in the range of 4–14. The remainder of the solid iron chelate composition was dissolved in water to form a clear solution containing approximately 20% by weight of iron. Solutions prepared in this manner were used as a spray on young bean plants grown in iron-deficient soil. After 20 days, the plants showed no evidence of iron chlorosis, in contrast to control plants which did not receive the spray. The treated plants showed substantially no evidence of leaf burning and appeared to have attained normal growth. In other words, there was no evidence of phytotoxicity induced by the iron chelate composition spray treatments.

Example IV

Hydrated ferric sulfate in the amount of 75 grams (equivalent to 15 grams of iron) was added to an aqueous caustic soda solution having a pH of 12 and containing 25 grams of the sodium glucoheptonate solution prepared according to Example II. The mixture became acidic and ferric hydroxide was precipitated. Caustic soda solution was added to adjust the pH to 11.5 and the solution became clear. Sulfuric acid was added until a turbidity was formed at pH 10. The pH was raised to 11 by the addition of caustic soda and 15 grams of sodium glucoheptonate solution (Example II) was added. Upon the gradual addition of sulfuric acid, the solution remained stable down to a pH of 8. Caustic soda solution was added to pH 10.8 and the solution became clear. An additional 5 grams of sodium glucoheptonate solution was added. Upon the gradual addition of sulfuric acid, the solution remained clear to a pH of 7.3. Caustic soda solution was again added until the solution became clear. A further addition of 20 grams of sodium glucoheptonate solution was made. Upon the gradual addition of sulfuric acid, the solution remained clear down to a pH of 4. The ratio of iron to sodium glucoheptonate in the solution at this stage was found to be 1:1. The solution containing 15 grams of iron and 15 grams of sodium glucoheptonate was adjusted to pH 7 by the addition of sulfuric acid and was thereafter concentrated to a specific gravity of 1.4. Methanol was added to precipitate the iron chelate and some of the sodium sulfate. The precipitate was filtered off and dried. The dried composition was found to dissolve readily in water to provide a stable solution of iron chelate over a range of pH 4 to 14. Severe boiling of a portion of the solution in the presence of hydrogen peroxide was required to break down the iron chelate and yielded a heavy precipitate of ferric hydroxide.

Table I shows the results of a preparation of a series of iron chelate compositions with varying ratios of iron to sodium glucoheptonate and the pH level above which the iron chelate remained stable. The compositions were made according to the method of Example III.

TABLE I

| Wt. (grams) Ratio Ferric Iron/sod. glucoheptonate | Minimum pH Level for Stability |
|---|---|
| 3 | 10.2 |
| 2.5 | --- |
| 2.0 | 9.6 |
| 1.5 | 8.4 |
| 1.0 | 6.5 |
| 0.66 | 4.0 |

The calculated iron content of the above chelate compositions was approximately 12%, based on the total solids content of the reaction mixture.

Figure 1 shows the curve (A) resulting from the plotting of the ratio of ferric iron/sodium glucoheptonate against the pH level at which precipitation occurs. The same figure shows also the results of a similar set of data derived by the method of the present invention with ferrous iron in place of ferric iron. A comparison of Curves A and B reveals that a substantially lower ratio of ferrous iron to chelating agent exists at the minimum pH level for stability than is the case for ferric iron. Curve C shows comparative data obtained with iron EDTA known to the trade under the tradework "Versene-$Fe^{+3}$." Curve C reveals the instability of the chelate represented thereby at pH levels above 4. The composition represented by Curve A does not possess this limitation.

Example V

A solution of 90 grams of ferrous sulfate monohydrate (containing 18 grams of ferrous iron) in 500 cc. of water and 27 grams of reagent grade sodium glucoheptonate was added with agitation. Upon gradual addition of 10% aqueous caustic soda solution, a heavy precipitate was formed at a pH of approximately 2.5. The pH of the mixture was raised to 11.8 by the addition of 55 grams of sodium hydroxide, whereupon the solution became clear. Lowering of the pH below 11.8 caused precipitation to occur. With the addition of 21 grams of sodium glucoheptonate and adjustment of the pH of the reaction mixture to 8 or above, the solution again became clear. The addition of sulfuric acid caused precipitation to occur at pH 8. An addition of 10 grams of sodium glucoheptonate and adjustment of the pH to 8 or above resulted in a clear solution which upon the addition of sulfuric acid remained clear down to a pH below 2. The ratio of ferrous iron to sugar acid salt required to produce a stable ferrous iron chelate composition was approximately 1:3.

Example VI

To a solution of 50% caustic soda containing 0.8% sodium glucoheptonate was added 0.1% of zinc as zinc chloride. The pH of the reaction mixture was 14. Upon agitation, a clear solution was formed. The solution remained clear when the pH was lowered to 4 by the addition of hydrochloric acid. A portion of the solution was adjusted in pH to 7 by the addition of caustic soda. The resulting solution was employed as a spray on young bean plants. The plants were found to thrive under this treatment.

Example VII

A solution of 0.757 sodium glucoheptonate and 50% caustic soda was prepared. To this solution was added 0.1% manganese as manganese sulfate. The pH of the reaction mixture was 14. The resulting solution was adjusted to a pH of 7 by the addition of sulfuric acid and was diluted with water to a concentration of 0.002% manganese. The resulting solution was applied to young bean sprouts which were thereafter found to thrive normally.

Example VIII

Ferric iron chelate composition as prepared according to the method of Example I was employed at a pH of 7 in the treatment of both acid and alkaline (calcareous) soils in which iron deficiencies had developed. The chelate composition was found to be stable over a period of a season's growth and vegetable plants such as beans and broccoli were found to thrive and to evidence no signs of iron chlorosis. The soil treatment was undertaken at levels at the rate of 5–10 pounds of chelate per acre and the chelate composition was administered in the form of a solid mixture with sand in the top layer of soil and lightly plowed under.

Example IX

An aqueous solution of 157 pounds of invert sugar derived from cane and known as "invert molasses," containing 75.5% total sugars of which approximately one-half was glucose and the remaining half was levulose was prepared by dissolving the invert sugar in 40 gallons of water. To the resulting solution was added 30 pounds of sodium cyanide and the mixture was agitated. After standing for 24 hours, the reaction mixture was boiled until evolution of ammonia ceased and the pH was approximately 8. The resulting composition was an aqueous solution of a mixture of the sodium salts of alpha and beta glucoheptonic acids and alpha and beta keto acids containing 7 carbon atoms. Ferric chelate compositions were prepared with this sugar acid composition according to the method of Example I. The resulting chelate compositions were found to behave in the same manner as the product of Example I, both as to stability and effectiveness as agents for agricultural use as plant sprays in the elimination of iron chlorosis. The material was found to be non-phytotoxic when applied to plants.

Example X

A carbohydrate mixture derived from thermohydrolytically treated lignocellulose by a method such as that described in U.S. Patent No. 1,824,221, and consisting mainly of arabinose, mannose, galactose, glucose and xylose sugar units and their precursors, was employed as the starting material in the preparation of a mixture of six and seven carbon atom sugar acids. The total solids content of the carbohydrate mixture was 60.9%. The total reducing sugars present (calculated as glucose) was 65%, of which 33% were pentosans and 32% were hexosans. An aqueous slurry of 175 pounds of the carbohydrate mixture was diluted with water to 40 gallons. To the slurry was added 30 pounds of sodium cyanide with agitation. The mixture was allowed to stand 24 hours and was then boiled until evolution of ammonia ceased and the pH was reduced to 8. The reaction mixture was filtered. The clear filtrate was composed essentially of the sodium salts of six and seven carbon atom sugar acids. This solution was employed in the preparation of ferric iron chelate compositions according to the method of Example I. The resulting iron chelate compositions in aqueous solution were found to be useful in the treatment of plants as a spray on the foilage thereof for the elimination of iron chlorosis.

Example XI

An aqueous solution of ferric chloride containing 0.2% by weight of iron was prepared. To this solution was added 0.3% by weight of potassium glucoheptonate. Upon gradual addition of 10% aqueous potassium hydroxide solution, a heavy gelatinous precipitate of ferric hydroxide was formed at a pH of approximately 2.5. Sufficient 3% aqueous potassium hydroxide solution was added to raise the pH to 11. The precipitate became dissolved and the solution was clear. To the clear solution was added gradually 1% aqueous hydrochloric acid until the pH of the solution was lowered to 4. The resulting solution was a composition comprising chelated ferric iron together with ionized iron and potassium chloride. The iron content was found to remain in solution over the pH range of 4 to 14. Addition of methanol to the solution in 1:1 proportion resulted in precipitation of the chelate composition which when recovered, dried and reconstituted with water was found to possess the same characteristics as the original solution of chelate composition.

Others may practice the invention in any of the numerous ways which will be suggested to one skilled in the art upon a reading of this specification. It is intended that all such practice of the invention be included hereunder provided it falls within the scope of the appended claims.

I claim:

1. A method of preparing a heavy metal chelate composition in which more than the equivalent weight of a heavy metal is complexed with an equivalent weight of an alkali-metal salt of a sugar acid containing at least 6 carbon atoms comprising reacting in an aqueous medium more than the equivalent weight of a salt of a heavy metal and an equivalent weight of an alkali-metal salt of a sugar acid containing at least 6 carbon atoms, adjusting the pH of the reaction mixture to a pH in the range of 8 to 14 and thereafter adjusting the pH to a pH in the range of 4 to 7.

2. The method of claim 1 in which the heavy metal chelate composition is recovered in solid form from the reaction mixture.

3. A method of preparing a heavy metal chelate composition in which more than the equivalent weight of a heavy metal is complexed with an equivalent weight of sodium glucoheptonate comprising reacting in an aqueous medium more than the equivalent weight of a salt of a heavy metal and an equivalent weight of sodium glucoheptonate, adjusting the pH of the reaction mixture to a pH in the range of 8 to 14 and thereafter adjusting the pH of the reaction mixture to a pH in the range of 4 to 7.

4. A method of preparing a heavy metal chelate composition in which more than an equivalent weight of a heavy metal is complexed with an equivalent weight of an alkali metal salt of a sugar acid containing 6 to 7 carbon atoms comprising reacting in an aqueous medium more than the equivalent weight of a salt of a heavy metal and an equivalent weight of an alkali-metal salt of a sugar acid containing 6 to 7 carbon atoms in the presence of sufficient of an alkalinizing agent to maintain the pH of the reaction mixture in the range of 8–14, and thereafter adjusting the pH of the reaction mixture to a pH in the range of 4 to 7.

5. A method of preparing a heavy metal chelate composition in which more than the equivalent weight of a heavy metal is complexed with an equivalent weight of sodium salts of a sugar acid mixture comprising reacting in an aqueous medium more than an equivalent weight of a salt of a heavy metal and an equivalent weight of a mixture of sodium salts of 7 carbon sugar acids derived by the sodium cyanidization of invert sugar and subsequent hydrolysis of the nitriles formed thereby, said heavy metal reaction being conducted in the presence of sufficient sodium hydroxide to maintain the pH of the reaction mixture in the range of 8 to 14, and thereafter adjusting the pH of the reaction mixture to a pH in the range of 4 to 7.

6. A method of preparing an iron chelate composition in which more than an equivalent weight of iron is complexed with an equivalent weight of sodium salts of a sugar acid mixture comprising reacting in an aqueous medium about 8.8 equivalent weights of a salt of iron and an equivalent weight of a mixture of sodium salts of 7 carbon sugar acids derived by the sodium cyanidization of invert sugar and subsequent hydrolysis of the nitriles formed thereby, said iron salt reaction being conducted in the presence of sufficient sodium hydroxide to maintain the pH of the reaction mixture in the range of 8 to 14, and thereafter adjusting the pH of the reaction mixture to a pH in the range of 4 to 7.

7. A method of preparing a heavy metal chelate composition in which more than an equivalent weight of a heavy metal is complexed with an equivalent weight of sodium salts of a sugar acid mixture comprising reacting in an aqueous medium more than an equivalent weight of a salt of a heavy metal and an equivalent weight of a mixture of sodium salts of 6 and 7 carbon atom sugar acids derived by the sodium cyanidization of a water-soluble carbohydrate mixture obtained from thermally hydrolyzed lignocellulose and subsequent hydrolysis of the nitriles resulting from said cyanidization, said heavy metal reaction being conducted in the presence of sufficient sodium hydroxide to maintain the pH of the reaction mixture in the range of 8 to 14, and thereafter adjusting the pH of the reaction mixture to a pH in the range of 4 to 7.

8. A method of preparing iron chelate compositions in which more than an equivalent weight of iron is complexed with an equivalent weight of sodium salts of a sugar acid mixture comprising reacting in an aqueous medium about 8.8 equivalent weights of a salt of iron and an equivalent weight of a mixture of sodium salts of 6 and 7 carbon atom sugar acids derived by the sodium cyanidization of a water-soluble carbohydrate mixture obtained from thermally hydrolyzed lignocellulose and subsequent hydrolysis of the nitriles resulting from said cyanidization, said iron salt reaction being conducted in the presence of sufficient sodium hydroxide to maintain the pH of the reaction mixture in the range of 8 to 14, and thereafter adjusting the pH of the reaction mixture to a pH in the range of 4 to 7.

9. A method of preparing a ferric iron chelate composition in which about 8.8 equivalent weights of ferric iron are complexed with an equivalent weight of potassium glucoheptonate comprising reacting in an aqueous medium about 8.8 equivalent weights of a ferric iron salt and an equivalent weight of potassium glucoheptonate in the presence of sufficient potassium hydroxide to maintain the pH of the reaction mixture in the range of 8 to 14, and thereafter adjusting the pH of the reaction mixture to a pH in the range of 4 to 7.

10. A method of preparing a ferric iron chelate composition in which about 8.8 equivalent weights of ferric iron are complexed with an equivalent weight of sodium glucoheptonate comprising reacting in an aqueous medium about 8.8 equivalent weights of a ferric iron salt and an equivalent weight of sodium glucoheptonate in the presence of sufficient ammonium hydroxide to maintain the pH of the reaction mixture above a pH of 8, and thereafter adjusting the pH of the reaction mixture to a pH in the range of 4 to 7 by the addition of a mineral acid.

11. A method of preparing a ferric iron chelate composition in which about 8.8 equivalent weights of ferric iron are complexed with an equivalent weight of sodium salts of a sugar acid mixture comprising reacting in an aqueous medium about 8.8 equivalent weights of a ferric iron salt and an equivalent weight of a mixture of sodium salts of 7 carbon sugar acids derived by the sodium cyanidization of invert sugar and subsequent hydrolysis of the nitriles formed thereby, said ferric iron salt reaction being conducted in the presence of sufficient sodium hydroxide to maintain the pH of the reaction mixture in the range of 8 to 14, and thereafter adjusting the pH of the reaction mixture to a pH in the range of 4 to 7.

12. A method of preparing a ferric iron chelate composition in which about 8.8 equivalent weights of ferric iron are complexed with an equivalent weight of sodium salts of a sugar acid mixture comprising reacting in an aqueous medium about 8.8 equivalent weights of a ferric iron salt and an equivalent weight of a mixture of sodium salts of 6 and 7 carbon atom sugar acids derived by the sodium cyanidization of a water-soluble carbohydrate mixture obtained from thermally hydrolyzed lignocellulose and subsequent hydrolysis of the nitriles resulting from said cyanidization, said ferric iron reaction being conducted in the presence of sufficient sodium hydroxide to maintain the pH of the reaction mixture in the range of 8 to 14, and thereafter adjusting the pH of the reaction mixture to a pH in the range of 4 to 7.

13. A method of preparing a ferrous iron chelate composition in which about 2.9 equivalent weights of ferrous iron are complexed with an equivalent weight of sodium glucoheptonate comprising reacting in an aqueous medium about 2.9 equivalent weights of a salt of ferrous iron with an equivalent weight of sodium glucoheptonate in the presence of sufficient sodium hydroxide to maintain the pH of the reaction mixture in the range of 8 to 14, and thereafter adjusting the pH of the reaction mixture to a pH in the range of 4 to 7.

14. A heavy metal chelate composition comprising a mixture of chelates of a heavy metal with alkali-metal salts of sugar acids containing at least 6 carbon atoms in which more than an equivalent weight of a heavy metal is complexed with an equivalent weight of alkali-metal salts of a sugar acid mixture, said mixture having a pH in aqueous solution in the range of 4 to 7, and said mixture being derived by reacting in an aqueous medium more than the equivalent weight of a salt of a heavy metal and an equivalent weight of alkali-metal salts of said sugar acids in the presence of sufficient of an alkalinizing agent to maintain the reaction mixture at a pH in the range of 8 to 14, and thereafter adjusting the pH of the reaction mixture to a pH in the range of 4 to 7, said mixture of chelates being further characterized by the presence therein of salts other than heavy metal salts formed by the adjustment of the pH of said reaction mixture in the manner set forth in this claim, and said mixture of chelates being further characterized by the presence therein of ionizable compounds of the heavy metal that are soluble in aqueous solution over a pH range of 4 to 14.

15. A ferric iron chelate composition comprising a mixture of ferric chelates of potassium glucoheptonate in which about 8.8 equivalent weights of ferric iron is complexed with an equivalent weight of potassium glucoheptonate, said mixture having a pH in aqueous solution in the range of 4 to 7, and being derived by reacting in aqueous solution about 8.8 equivalent weights of a salt of ferric iron and an equivalent weight of potassium glucoheptonate in the presence of sufficient potassium hydroxide to maintain the reaction mixture at a pH in the range of 8 to 14, and thereafter adjusting the pH of the reaction mixture to a pH in the range of 4 to 7, said mixture of ferric chelates being further characterized by the presence therein of potassium salts formed by the adjustment of the pH of said reaction mixture in the manner set forth in this claim, and said mixture of chelates being further characterized by the presence therein of ionizable compounds of ferric iron that are soluble in aqueous solution over a pH range of 4 to 14.

16. A ferric iron chelate composition comprising a mixture of ferric chelates of sodium salts of 7 carbon atom sugar acids derived by the sodium cyanidization of invert sugar and subsequent hydrolysis of the nitriles formed thereby, said chelates being characterized by the presence of complexes containing about 8.8 equivalent weights of ferric iron to one equivalent weight of sodium salts of the sugar acid mixture, said mixture of chelates having a pH in aqueous solution in the range of 4 to 7, and said chelates being derived by reacting in aqueous solution about 8.8 equivalent weights of a salt of ferric iron and an equivalent weight of the sodium salts of said sugar acids in the presence of sufficient sodium hydroxide to maintain the reaction mixture at a pH in the range of 8 to 14, and thereafter adjusting the pH of said reaction mixture to a pH in the range of 4 to 7, said mixture of ferric chelates being further characterized by the presence therein of sodium salts formed by the adjustment of the pH of said reaction mixture as set forth in this claim, and said mixture of chelates being further characterized by the presence therein of ionizable compounds of ferric iron that are soluble in aqueous solution over a pH range of 4 to 14.

17. A ferric iron chelate composition comprising a mixture of ferric chelates of sodium salts of 6 and 7 carbon atom sugar acids derived by the sodium cyanidization of a water-soluble carbohydrate mixture obtained from thermally hydrolyzed lignocellulose and subsequent hydrolysis of the nitriles resulting from said cyanidization, said chelates being characterized by the presence of complexes containing about 8.8 equivalent weights of ferric iron to one equivalent weight of sodium salts of the sugar acid mixture said mixture of chelates having a pH in the range of 4 to 7, and said chelates being derived by reacting in aqueous solution about 8.8 equivalent weights of a salt of ferric iron and an equivalent weight of the sodium salts of said sugar acids in the presence of sufficient sodium hydroxide to maintain the reaction mixture at a pH in the range of 8 to 14, and thereafter adjusting the pH of said reaction mixture to a pH in the range of 4 to 7, said mixture of ferric chelates being further characterized by the presence therein of sodium salts formed by the adjustment of the pH of said reaction mixture as set forth in this claim, and said mixture of chelates being further characterized by the presence therein of ionizable compounds of ferric iron that are soluble in aqueous solution over a pH range of 4 to 14.

18. An agricultural spray composition comprising an aqueous solution of the composition set forth in claim 16.

References Cited in the file of this patent

FOREIGN PATENTS

| 335,965 | Great Britain | Oct. 6, 1930 |
| 503,212 | Great Britain | June 28, 1937 |

OTHER REFERENCES

Prescott et al.: Ind. and Eng. Chem., vol. 45, pp. 338 to 342 (1953).

Mehltretter et al.: Ind. and Eng. Chem., vol. 45, pp. 2782–2784 (1953).

Antognini: Agricultural Chemicals, Nov. 1954, pp. 47 to 49.